(12) United States Patent
Bentrem

(10) Patent No.: US 9,082,190 B2
(45) Date of Patent: *Jul. 14, 2015

(54) COMPUTATIONALLY EFFICIENT METHOD FOR IMAGE SEGMENTATION WITH INTENSITY AND TEXTURE DISCRIMINATION

(71) Applicant: Frank W. Bentrem, Orange City, IA (US)

(72) Inventor: Frank W. Bentrem, Orange City, IA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/947,281

(22) Filed: Jul. 22, 2013

(65) Prior Publication Data

US 2013/0308830 A1    Nov. 21, 2013

Related U.S. Application Data

(63) Continuation of application No. 12/711,395, filed on Feb. 24, 2010, now Pat. No. 8,498,480.

(60) Provisional application No. 61/155,171, filed on Feb. 25, 2009.

(51) Int. Cl.
G06K 9/34 (2006.01)
G06T 7/00 (2006.01)
G06T 7/40 (2006.01)

(52) U.S. Cl.
CPC ............. *G06T 7/0081* (2013.01); *G06T 7/403* (2013.01); *G06T 2207/30096* (2013.01); *G06T 2207/30188* (2013.01)

(58) Field of Classification Search
CPC .................................................. G06K 9/0014
USPC ........................................................ 382/164
See application file for complete search history.

(56) References Cited

U.S. PATENT DOCUMENTS 5,341,439 A    8/1994    Hsu
5,796,862 A    8/1998    Pawlicki et al.
(Continued)

OTHER PUBLICATIONS

X. Descombes, M. Moctezuma, H. Maître, J.P. Rudant, "Coastline detection by a Markovian segmentation on SAR images," Signal Process. 55, 123-132 (1996).
(Continued)

*Primary Examiner* — Gandhi Thirugnanam
(74) *Attorney, Agent, or Firm* — US Naval Research Laboratory; Kathleen Chapman; Suresh Koshy

(57) ABSTRACT

A computationally efficient image segmentation method is provided that processes a grayscale digital image to more clearly show textures in the underlying object shown in the digital image. A grayscale digital image is converted to an intensity matrix based on the brightness of the pixels in the image, where each matrix element represents a pixel in the digital image and has a value corresponding to the intensity, i.e., the brightness, of that pixel. The value of each matrix element is compared to the value of its nearest neighbor matrix element, and the pixel represented by the matrix element is categorized as being "dark" or "bright" based on its value, and is categorized as being "smooth" or "rough" based on the values of the nearest neighbor matrix elements. As each pixel is categorized, it is assigned a shading level corresponding to the brightness/texture matrix element value. A processed image having only the assigned shading levels is then produced, with the processed image indicating textures of the underlying object shown in the original grayscale digital image.

8 Claims, 13 Drawing Sheets

(56) References Cited

U.S. PATENT DOCUMENTS

| | | | |
|---|---|---|---|
| 5,805,221 | A | 9/1998 | Lee |
| 5,825,909 | A | 10/1998 | Jang |
| 6,466,687 | B1 | 10/2002 | Uppaluri |
| 6,625,333 | B1 | 9/2003 | Wang et al. |
| 6,647,132 | B1 | 11/2003 | Montillo |
| 6,832,000 | B2 | 12/2004 | Herman |
| 6,903,782 | B2 | 6/2005 | Herman et al. |
| 7,030,885 | B2 | 4/2006 | Kim et al. |
| 7,076,095 | B2 | 7/2006 | Kim et al. |
| 7,366,323 | B1* | 4/2008 | Yao et al. ............ 382/103 |
| 7,466,848 | B2 | 12/2008 | Metaxas et al. |
| 7,949,181 | B2 | 5/2011 | Padfield et al. |
| 8,155,465 | B2 | 4/2012 | Cho et al. |
| 8,498,480 | B2* | 7/2013 | Bentrem ............ 382/173 |
| 2002/0031247 | A1 | 3/2002 | Matsuura et al. |
| 2002/0090133 | A1 | 7/2002 | Kim et al. |
| 2002/0136449 | A1 | 9/2002 | Park et al. |
| 2002/0181771 | A1 | 12/2002 | Li et al. |
| 2003/0012438 | A1 | 1/2003 | Krtolica |
| 2003/0053685 | A1 | 3/2003 | Lestideau |
| 2003/0108237 | A1 | 6/2003 | Hirata |
| 2003/0179931 | A1 | 9/2003 | Sun |
| 2004/0101176 | A1 | 5/2004 | Mendonca et al. |
| 2004/0218838 | A1 | 11/2004 | Tojo et al. |
| 2006/0222231 | A1* | 10/2006 | Harris et al. ............ 382/141 |
| 2009/0003691 | A1* | 1/2009 | Padfield et al. ............ 382/164 |
| 2009/0164281 | A1 | 6/2009 | Norgaard et al. |
| 2010/0142846 | A1* | 6/2010 | Tolliver et al. ............ 382/274 |
| 2010/0232698 | A1 | 9/2010 | Bentrem |
| 2010/0303348 | A1* | 12/2010 | Tolliver et al. ............ 382/164 |
| 2011/0170768 | A1* | 7/2011 | Alldrin et al. ............ 382/159 |
| 2012/0301018 | A1 | 11/2012 | Lee et al. |

OTHER PUBLICATIONS

F. W. Bentrem, W. E. Avera, J. Sample, "Estimating Surface Sediments Using Multibeam Sonar," Sea Technol. 47, 37 (2006).

D. L. Pham, C. Xu, J. L. Prince, "Current Methods in Medical Image Segmentation," Annu. Rev. Biomed. Eng. 2, 315 (2000).

Y. H. Yang, M. J. Buckley, S. Dudoit, T. P. Speed, "Comparison of Methods for Image Analysis on DNA Microarray Data," J. Comput. Graph. Stat. 11, 108 (2002).

S. Peng, B. Urbanc, L. Cruz, B. T. Hyman, H. E. Stanley, "Neuron recognition by parallel Potts segmentation," P. Natl. Acad. Sci. USA 100, 3847 (2003).

V. Grau, A. U. J. Mewes, M. Alcañiz, "Improved Watershed Transform for Medical Image Segmentation Using Prior Information," IEEE T. Med. Imaging 23, 447 (2004).

T. Asano, D. Z. Chen, N. Katoh, T. Tokuyama, "Polynomial-Time Solutions to Image Segmentation," Int. J. Comput. Geom. Ap. 11, 145 (2001).

K. Tanaka, "Statistical-mechanical approach to image processing," J. Phys. A-Math. Gen. 35, R81-R150 (2002).

K. Tanaka, H. Shouno, M. Okadak, D. M. Titterington, "Accuracy of the Bethe approximation for hyperparameter estimation in probabilistic image processing," J. Phys. A-Math. Gen. 37, 8675 (2004).

X. Descombes, M. Moctezuma, H. Maîrtre, J.P. Rudant, "Coastline detection by a Markovian segmentation on SAR images," Signal Process. 55, pp. 123-132 (1996).

F. W. Bentrem, W. E. Avera, J. Sample, "Estimating Surface Sediments Using Multibeam Sonar," Sea Technol. 47:6, pp. 37, 38, 40 (2006).

D. L. Pham, C. Xu, J. L. Prince, "Current Methods in Medical Image Segmentation," Annu. Rev. Biomed. Eng. 2, pp. 315-337 (2000).

Y. H. Yang, M. J. Buckley, S. Dudoit, T. P. Speed, "Comparison of Methods for Image Analysis on cDNA Microarray Data," J. Comput. and Graph. Stat. 11, pp. 108-136 (2002).

S. Peng, B. Urbanc, L. Cruz, B. T. Hyman, H. E. Stanley, "Neuron recognition by parallel Potts segmentation," P. Natl. Acad. Sci. USA 100:7, pp. 3847-3852 (2003).

V. Grau, A. U. J. Mewes, M. Alcañiz, "Improved Watershed Transform for Medical Image Segmentation Using Prior Information," IEEE T. Med. Imaging 23:4, pp. 447-458 (2004).

T. Asano, D. Z. Chen, N. Katoh, T. Tokuyama, "Polynomial-Time Solutions to Image Segmentation," Proceedings of the seventh annual ACM-SIAM symposium on Discrete algorithms, Atlanta, GA, Society for Industrial and Applied Mathematics, Philadelphia, PA, pp. 104-113, (Jan. 28-30, 1996).

K. Tanaka, "Statistical-mechanical approach to image processing," J. Phys. A-Math. Gen. 35, pp. R81-R150 (2002).

K. Tanaka, H. Shouno, M. Okadak, D. M. Titterington, "Accuracy of the Bethe approximation for hyperparameter estimation in probabilistic image processing," J. Phys. A-Math. Gen. 37, pp. 8675-8695 (2004).

Notice of Allowance, Computationally efficient method for image segmentation with intensity and texture discrimination, Frank W. Bentrem, U.S. Appl. No. 12/711,395, mail date Jul. 10, 2013, US Patent No. 8,498,480, issue date Jul. 30, 2013.

Office Action, Non-Final Rejection, Frank W. Bentrem, U.S. Appl. No. 12/711,395, mail date Dec. 17, 2012.

U.S. Appl. No. 61/155,171, 4-Level spin-glass image segmentation with energy minimization, Frank W. Bentrem, filed Feb. 25, 2009.

* cited by examiner

FIG. 3

| 1 | 1 | 1 | 1 | 3 | 3 | 3 | 3 | 3 |
|---|---|---|---|---|---|---|---|---|
| 1 | 1 | 1 | 1 | 3 | 3 | 3 | 3 | 3 |
| 1 | 1 | 1 | 1 | 3 | 3 | 3 | 3 | 3 |
| 1 | 1 | 1 | 3 | 3 | 3 | 3 | 3 | 3 |
| 1 | 1 | 1 | 1 | 3 | 1 | 3 | 3 | 3 |
| 1 | 1 | 3 | 1 | 1 | 1 | 3 | 1 | 3 |
| 1 | 1 | 1 | 1 | 1 | 1 | 1 | 3 | 3 |
| 1 | 1 | 1 | 1 | 1 | 1 | 1 | 1 | 3 |
| 1 | 1 | 0 | 0 | 0 | 1 | 1 | 1 | 3 |
| 1 | 1 | 1 | 1 | 0 | 1 | 1 | 1 | 1 |

*FIG. 6*

COMPUTATIONALLY EFFICIENT METHOD FOR IMAGE SEGMENTATION WITH INTENSITY AND TEXTURE DISCRIMINATION

CROSS-REFERENCE

This application is a continuation of U.S. patent application Ser. No. 12/711,395, filed on Feb. 24, 2010, entitled COMPUTATIONALLY-EFFICIENT METHOD FOR IMAGE SEGMENTATION WITH INTENSITY AND TEXTURE DISCRIMINATION and claims the benefit of priority based on U.S. Provisional Patent Application No. 61/155,171 filed on Feb. 25, 2009, entitled COMPUTATIONALLY-EFFICIENT METHOD FOR IMAGE SEGMENTATION WITH INTENSITY AND TEXTURE DISCRIMINATION, both of which are hereby incorporated in entirety by reference into the present application.

TECHNICAL FIELD

The present invention relates to the field of digital image processing, particularly processing of grayscale digital images to reflect brightness and texture.

BACKGROUND

Segmenting digital images into regions of distinct types is a useful form of image processing that can be very useful to more clearly depict features in the image. It has significant uses in both military and civilian applications to permit both more rapid and more accurate analysis of many types of imagery.

For example, segmentation can automate the mapping and labeling of images from synthetic aperture radar and satellite according to landscape type (for example, agricultural, forest, lake) and so enhance surveillance. See, e.g., X. Descombes, M. Moctezuma, H. Maître, J. P. Rudant, "Coastline detection by a Markovian segmentation on SAR images," *Signal Process.* 55, 123-132 (1996). Similarly, segmentation of underwater sonar images can be used to delineate sea floor regions of mud, sand, and rock, which can aid in mine detection by predicting the degree of mine burial in the seafloor and in allowing optimal sonar settings to detect such buried mines. See, e.g., F. W. Bentrem, W. E. Avera, J. Sample, "Estimating Surface Sediments Using Multibeam Sonar," *Sea Technol.* 47, 37 (2006).

In addition to aiding in the analysis of remote imaging, image segmentation can be used with medical imaging to aid health workers in identifying abnormalities such as tumors in medical images. See, e.g., D. L. Pham, C. Xu, J. L. Prince, "Current Methods in Medical Image Segmentation," *Annu. Rev. Biomed. Eng.* 2, 315 (2000); Y. H. Yang, M. J. Buckley, S. Dudoit, T. P. Speed, "Comparison of Methods for Image Analysis on DNA Microarray Data," *J. Comput. Graph. Stat.* 11, 108 (2002); S. Peng, B. Urbanc, L. Cruz, B. T. Hyman, H. E. Stanley, "Neuron recognition by parallel Potts segmentation," *P. Natl. Acad. Sci. USA* 100, 3847 (2003); V. Grau, A. U. J. Mewes, M. Alcañiz, "Improved Watershed Transform for Medical Image Segmentation Using Prior Information," *IEEE T. Med. Imaging* 23, 447 (2004).

In general, image segmentation is performed by classifying image regions by color, intensity, and texture, with only the latter two being considered in grayscale segmentation. There can be a large number of possible intensities and texture types in a digital image, and thus sufficiently representing the intensities and textures in the image can be an important part of image processing.

A grayscale digital image may be represented as a matrix of numerical values which indicate the intensity or brightness (gray level) of the corresponding image pixel. Techniques for image segmentation (such as thresholding and histogram methods) that focus solely on intensity are the most computationally efficient since they generally require just one or two passes through the intensity matrix. While classification by intensity is a straightforward assessment of the brightness/darkness of an image pixel or group of pixels (as with histogram segmentation methods such as those described in Pham et al., supra), texture classification is much more complex. See Pham et al., supra; see also T. Asano, D. Z. Chen, N. Katoh, T. Tokuyama, "Polynomial-Time Solutions to Image Segmentation," *Int. J. Comput. Geom. Ap.* 11, 145 (2001). Texture can be described by the spatial relationship of the intensities (i.e. "graininess") of an image region. However, accurately identifying regions of different texture can be relatively expensive in terms of computation time because of the complexity and diversity involved. See T. Asano, supra. Many prior art image segmentation techniques process in exponential time, i.e., the time required to process a digital image increases exponentially with the number of pixels contained in the image. See K. Tanaka, "Statistical-mechanical approach to image processing," *J. Phys. A-Math. Gen.* 35, R81-R150 (2002). Although advances have been made via certain approximations such as the Bethe approximation, image segmentation using these methods still requires power-law time, i.e., 10 times the number of pixels takes about 1000 times (10 to the $3^{rd}$ power) as long. See K. Tanaka, supra; see also K. Tanaka, H. Shouno, M. Okadak, D. M. Titterington, "Accuracy of the Bethe approximation for hyperparameter estimation in probabilistic image processing," *J. Phys. A-Math. Gen.* 37, 8675 (2004). However, real-time processing (such as for sonar imagery) requires much greater efficiency and thus these methods have not proven satisfactory.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a computationally efficient computer-implemented method for segmenting a grayscale digital image into provinces of four or more types, each of which indicates a local brightness intensity level and texture. The segmented grayscale images can often provide better indications of the presence of texture features than do the original grayscale images, and can thus have great utility in the analysis of remotely sensed images provided by seafloor, airborne, and satellite imagery as well as for other images such as those produced by medical imaging techniques. Image segmentation in accordance with the present invention proceeds linear time, which is much faster than prior art methods and allows for much greater processing efficiency and near real-time analysis.

In accordance with the present invention, a grayscale digital image is converted to an intensity matrix based on the brightness of the pixels in the image, where each matrix element represents a pixel in the digital image and has a value corresponding to a quantized intensity, i.e., brightness, of that pixel. For example, a scale of 0 to 9 can be used, with the darkest pixels being given a value of 0 and the brightest pixels being given a value of 9. The value of each matrix element is compared to the value of its nearest neighbor matrix elements. A pixel is categorized as being "dark" or "bright" based on its value, and is categorized as being "smooth" if the values of its neighbors are "uniform," i.e., the same as its value, or as being "rough" if the values of its neighbors are "variable," if one or more neighboring value differs from the pixel's value. Thus, in accordance with the present invention, each pixel is characterized as being one of "dark and uniform," "dark and variable," "bright and uniform," or "bright and variable" based on the values of the elements in the intensity matrix, and is given a corresponding value, e.g., from 0 to 3, to transform the intensity matrix into a brightness/texture matrix. For visualization, as each pixel is categorized, it is assigned one of four shading levels corresponding to the brightness/texture matrix element value. A processed image having only those four shading levels is then produced, with the processed image indicating textures of the underlying object shown in the original grayscale digital image.

BRIEF DESCRIPTION OF THE DRAWINGS

FIG. 3 depicts an exemplary intensity matrix that can be used in a computer-implemented image segmentation method in accordance with the present invention.

FIG. 6 depicts an exemplary brightness/texture value matrix created by transforming an intensity matrix in a computer-implemented image segmentation method in accordance with the present invention.

DETAILED DESCRIPTION

The aspects and features of the present invention summarized above can be embodied in various forms. The following description shows, by way of illustration, combinations and configurations in which the aspects and features described herein can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a computationally efficient computer-implemented method for digital image processing that uses image segmentation to rapidly and efficiently characterize regions in the image according to their brightness and texture. Image segmentation and image processing in accordance with the method of the present invention can be accomplished by executing one or more sequences of instructions contained in computer-readable program code read into a memory of one or more general or special-purpose computers configured to execute the instructions, wherein a raw digital image is transformed into a processed image containing shaded areas indicative of the brightness and texture of the object depicted in the image. Image segmentation and processing in accordance with the present invention can be accomplished in linear time, where twice the data (e.g., twice as many pixels) requires about twice the processing time. This provides a significant improvement over prior art methods which can only perform image segmentation in exponential time (twice as many pixels takes a square of the amount of time) or in power-law time (e.g., with a power of three, twice the number of pixels takes 8 times the amount of time). This allows one to segment large amounts of imagery data that would otherwise take a prohibitively long time or an expensive supercomputer.

The invention also includes a computer program product comprising a computer-usable medium having computer-readable program code embodied thereon, the computer-readable program code adapted to be executed to implement a method for processing digital grayscale images in accordance with one or more aspects described herein.

The method of the present invention will now be described in the context of the Figures, which illustrate in exemplary fashion certain aspects of the present invention and form a part of the disclosure herein.

Figure 1:
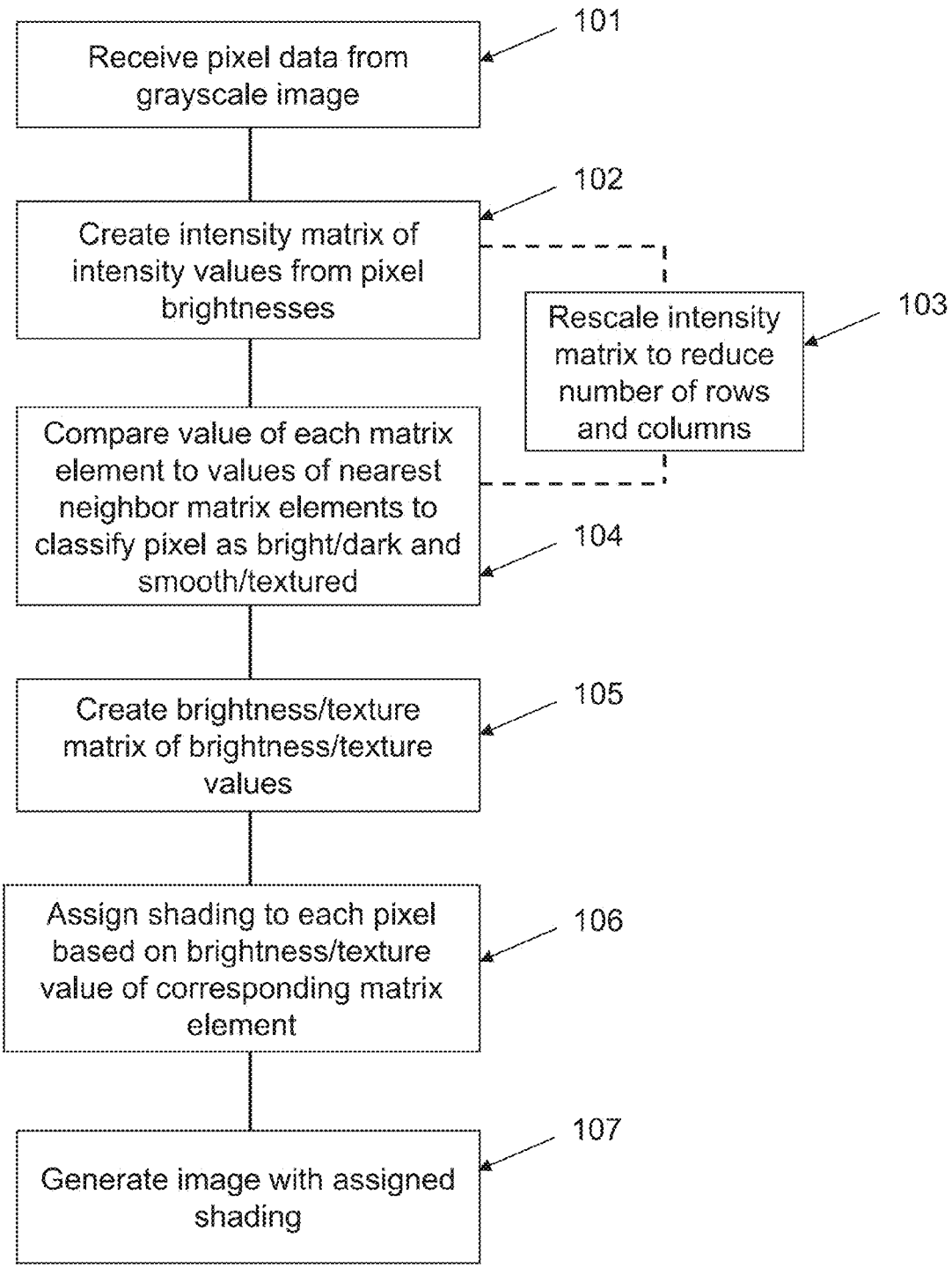
FIG. 1 depicts aspects of an exemplary process flow that can be used in a computer-implemented image segmentation method in accordance with the present invention.

FIG. 1 illustrates an exemplary process flow that can be used by one or more computers to perform image segmentation and image processing in accordance with the method of the present invention.

At step 101, the computer can receive pixel data representing a grayscale digital image from any type of local or remote source such as volatile or non-volatile memory in the computer performing the steps of the method or a remote computer, removable storage media, etc. The digital image can be any type of grayscale image produced by any type of imaging technique, such as a photographic image, an image from acoustic imaging sources such as sonar or ultrasound, or magnetic resonance imaging (MRI).

Figure 2:
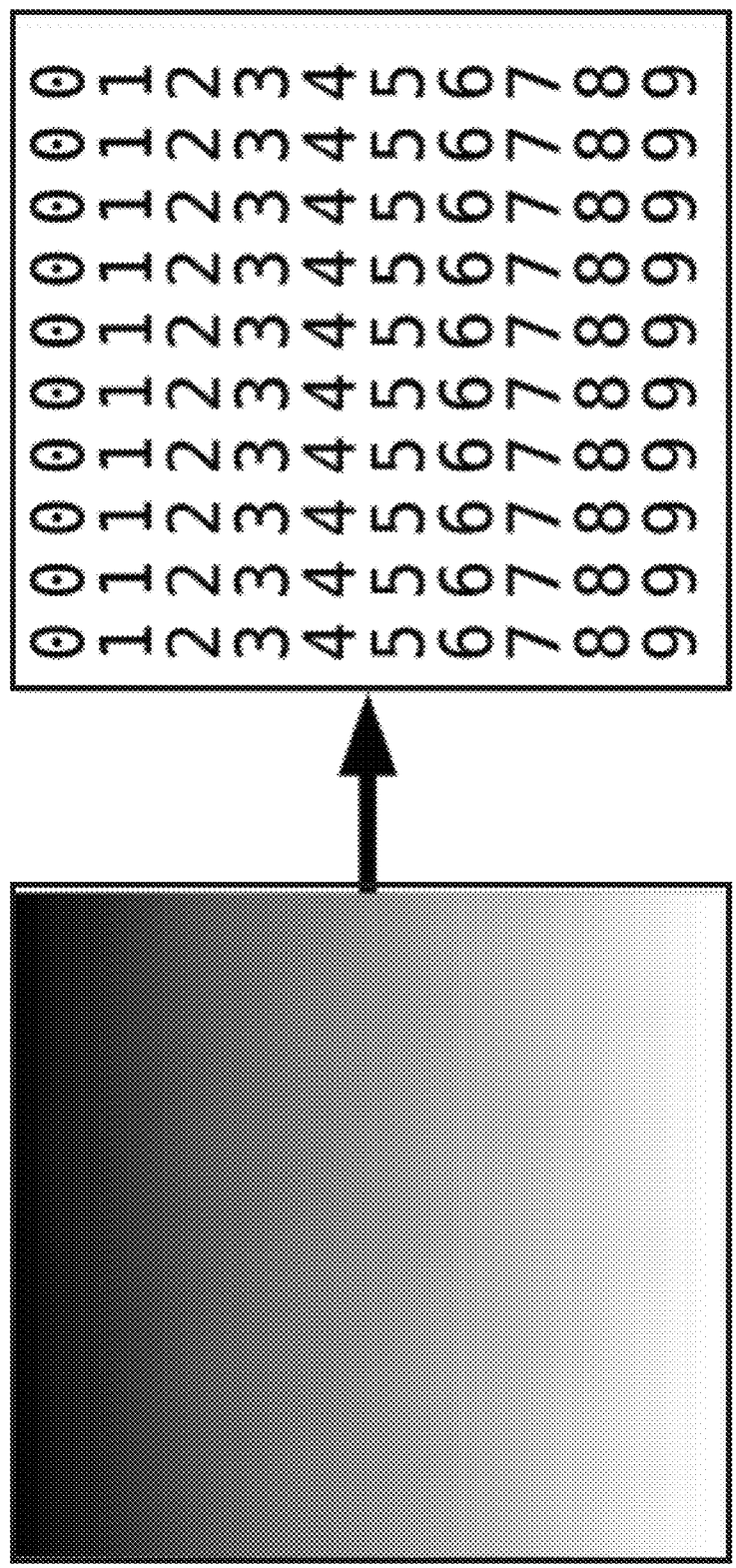
FIG. 2 depicts the manner in which a grayscale image can be converted to a matrix of pixel intensities for use in a computer-implemented image segmentation method in accordance with the present invention.

The pixels of a grayscale image can each be represented by a number representing some quantizable quality of the pixel. For example, as shown in FIG. 2, a grayscale image can be divided into 10 quantized grayscale categories based on the intensity, i.e., the brightness, of the pixels. In the exemplary case shown in FIG. 2, the darkest pixels can be given an intensity value of 0, increasing to the brightest pixels which can be given an intensity value of 9. Of course, other scales and numbering schemes are possible, e.g., a scale of 0 to 20 or the darker pixels being assigned the higher numbers, so long as the increase/decrease in number with the brightness of the pixel remains consistent throughout the image processing.

Figure 3:
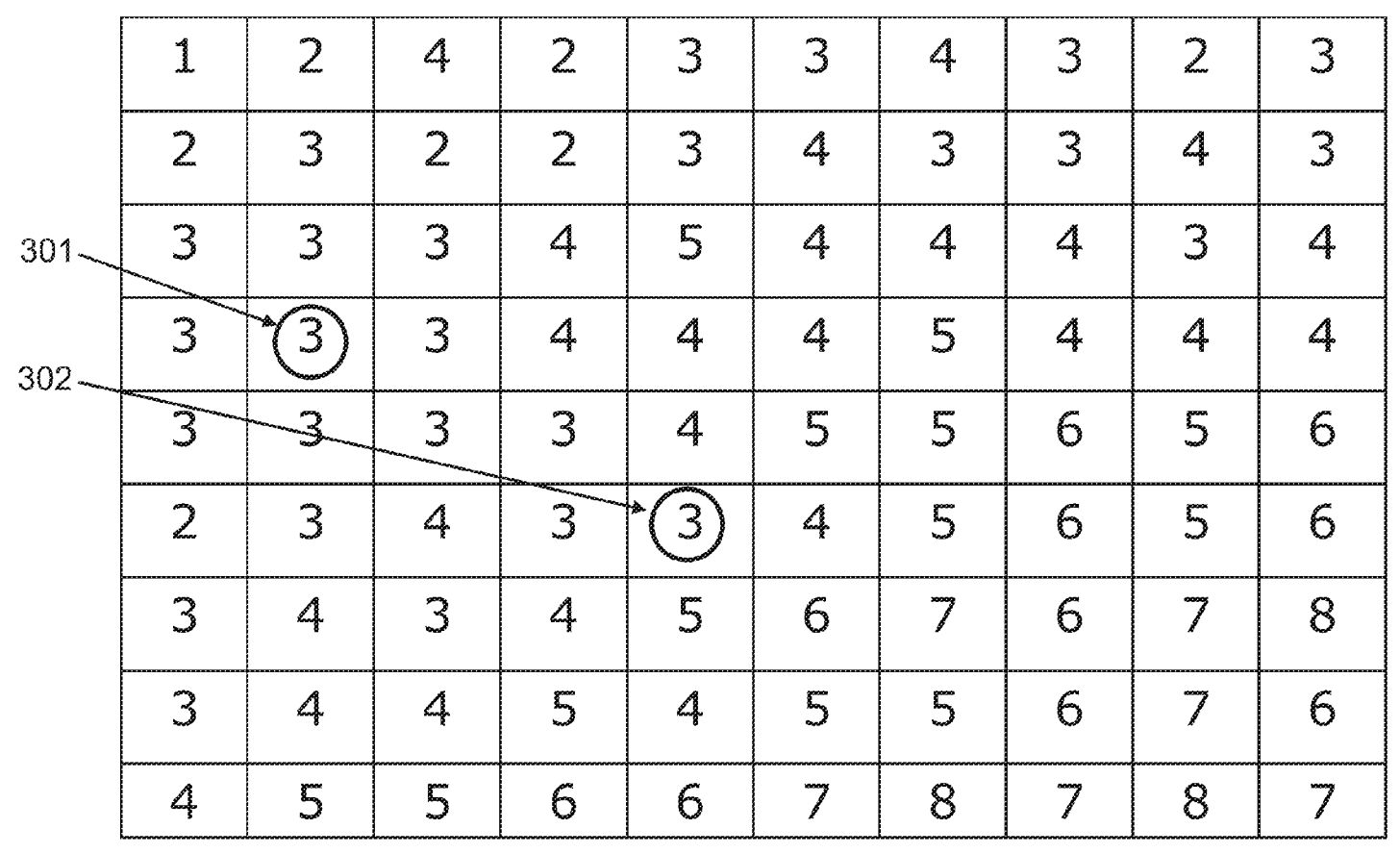

Thus, at step 102, the pixel data of the grayscale image can be transformed into an intensity matrix, where the value of each matrix element represents a brightness of the pixel as described above. An exemplary intensity matrix is shown in FIG. 3, and represents the brightness levels of a portion of a digital image, with the darkest pixels in that portion of the image being given a value of 1 and the brightest pixels being given a value of 7 based on the exemplary 0 to 9 scale described above.

In some cases, an image may have too fine a resolution, i.e., too many pixels, to permit the segmented image to provide an accurate indication of the textures in the object depicted. For example, a grayscale image may depict a rippled bottom, but the processed image may show the bottom as simply "dark and smooth" and "bright and smooth." In such cases it may be desirable for the computer at optional step 103 to rescale the intensity matrix as described in more detail below to reduce the number of matrix elements to better allow the texture to be shown. Step 103 need not be performed in every case, but it can be performed to improve the results if an initial segmentation does not provide a satisfactory result.

After any rescaling of the matrix is performed at step 103, or after creation of the intensity matrix at step 102 if the matrix is not rescaled, in accordance with the method of the present invention, at step 104, each cell in the intensity matrix is examined to determine whether it represents a "dark" pixel or a "bright" one based on the value of the matrix element so visited. For example, in the exemplary embodiment described herein in which matrix elements were assigned intensity values ranging from 0 for the darkest pixels to 9 for the brightest ones, matrix elements can be classified as representing "dark" pixels if they have a value of 0 to 4 and as representing "bright" pixels if they have a value of 5 to 9. Thus in the exemplary intensity matrix illustrated in FIG. 3, matrix elements 301 and 302 both have a value of "3," i.e., between 0 and 4, and so are categorized as representing a "dark" pixel.

In addition to being categorized as being "dark" or "bright" as described above, in accordance with the method of the present invention, each pixel also can be categorized as being "smooth" or textured" based on values of the elements in the intensity matrix. As noted above, texture can be described by the spatial relationship of the intensities (i.e. "graininess") of an image region. An area of the image depicting a "textured" area will have more variation in pixel intensity, whereas a "smooth" area will have less variation. Thus, in accordance with the present invention, as the process visits each matrix element in the intensity matrix, the value of each element is compared to the values of its nearest neighbor matrix elements to determine whether the image pixel represented by the element should be characterized as "textured" or "smooth." In accordance with the present invention, a matrix element will be considered to be "smooth" if it and all of its nearest neighbors have the same value, while a matrix element will be considered to represent a "textured" image pixel if any of its nearest neighbors have a different value.

Figure 4:
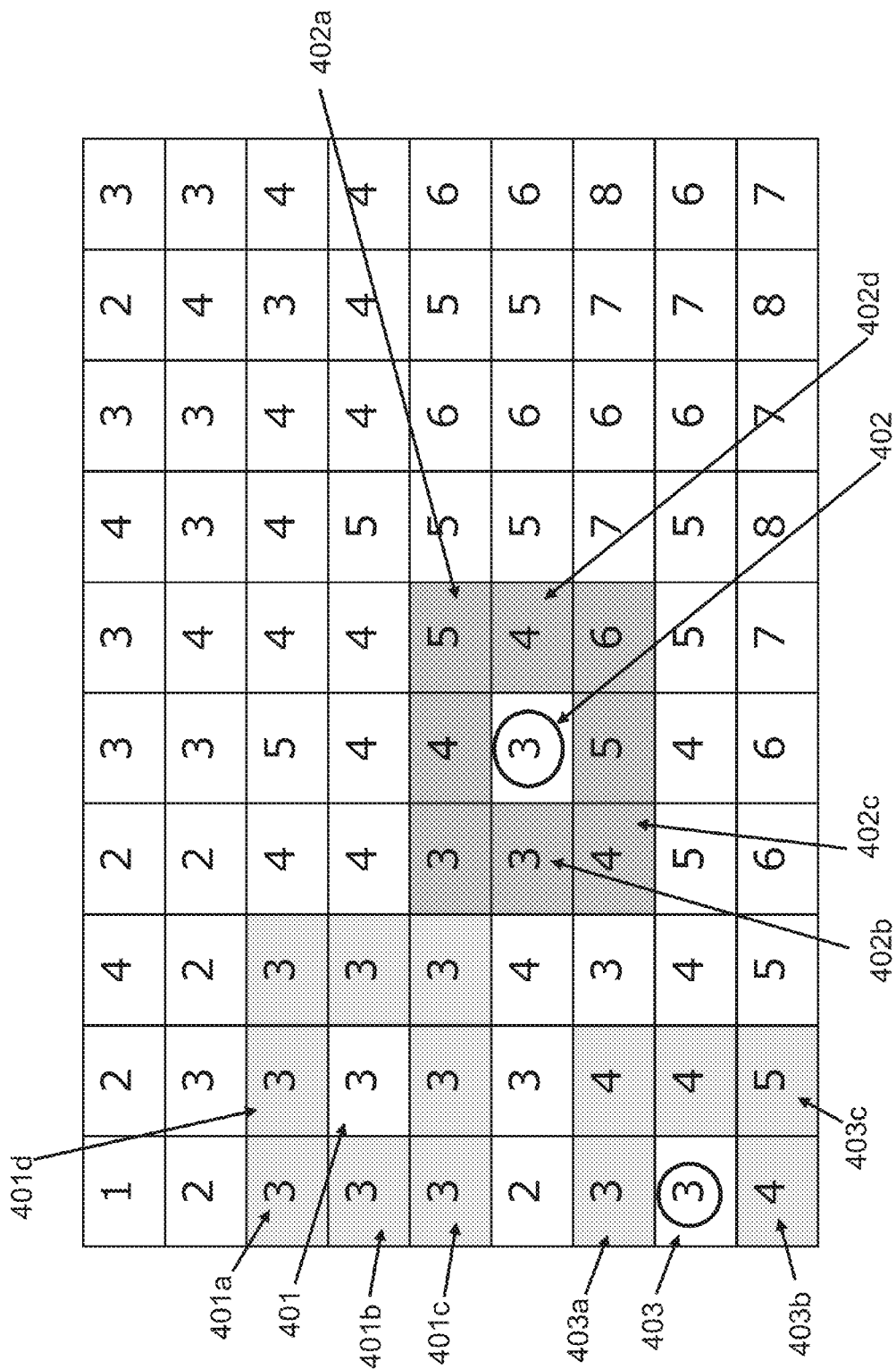
FIG. 4 depicts aspects of nearest-neighbor intensity value comparison that can be used in a computer-implemented image segmentation method in accordance with the present invention.

An exemplary application of this aspect of the method of the invention is shown in FIG. 4. As shown in FIG. 4, the value of matrix element 401 is compared to the value of its surrounding nearest neighbor elements such as element 401a, 401b, 401c, and 401d. Because all such elements have a value of 3, element 401 is considered to be "smooth", i.e., to have a uniform texture. In contrast, matrix element 402, which also has a value of 3, is compared to its surrounding nearest neighbor elements, such as elements 402a, 402b, 402c, 402d. Only element 402b has a value of 3, while the other elements 402a, 402c, 402d have different values, and therefore, in accordance with the present invention, matrix element 402 is considered to be "rough" i.e., to have a variable texture. In the case of "edge pixel" matrix elements such as matrix element 403, comparison is made to its nearest neighbor elements such as elements 403a, 403b, and 403 as well, i.e., comparison is made to those nearest neighbors that a matrix element may have to determine whether the pixel is "rough" or "smooth."

At step 105 in accordance with the present invention, each matrix element can be given a new value based on the characterization of its underlying pixel as having a dark or bright intensity and a uniform (i.e., smooth) or variable (i.e., rough) texture. For example, in the exemplary embodiment illustrated in FIGS. 5 and 6, a pixel that is characterized as being "dark and uniform" (box 501 shown in FIG. 5) is given a matrix element value of "0"; a pixel that is characterized as being "dark and variable" (box 502) is given a matrix element value of 1; a pixel characterized as "bright and uniform" (box 503) is given a matrix element value of 2; and a pixel characterized as "bright and variable" (box 504) is given a matrix element value of 3. This step is repeated for each cell in the matrix and can be done immediately after each matrix element and its neighbors are examined as described above. The result is a new matrix ("brightness/texture matrix") in which a uniquely defined value representing one out of four brightness/texture categories is assigned to each image pixel.

Thus, in accordance with the present invention, data of the digital image can be transformed into an intensity matrix, which in turn can be transformed into a matrix representative of the brightness and texture of the underlying image represented by each pixel. Because the transformation of the intensity matrix into the brightness/texture matrix requires only a single pass through the intensity matrix, it can be accomplished in linear time directly proportional to the number of pixels in the image. Furthermore, only a few CPU operations are performed for each pixel, making the method of the present invention much more rapid and efficient than previous methods which required multiple passes through the image and/or many CPU operations per pixel to achieve similar results.

Figure 5:
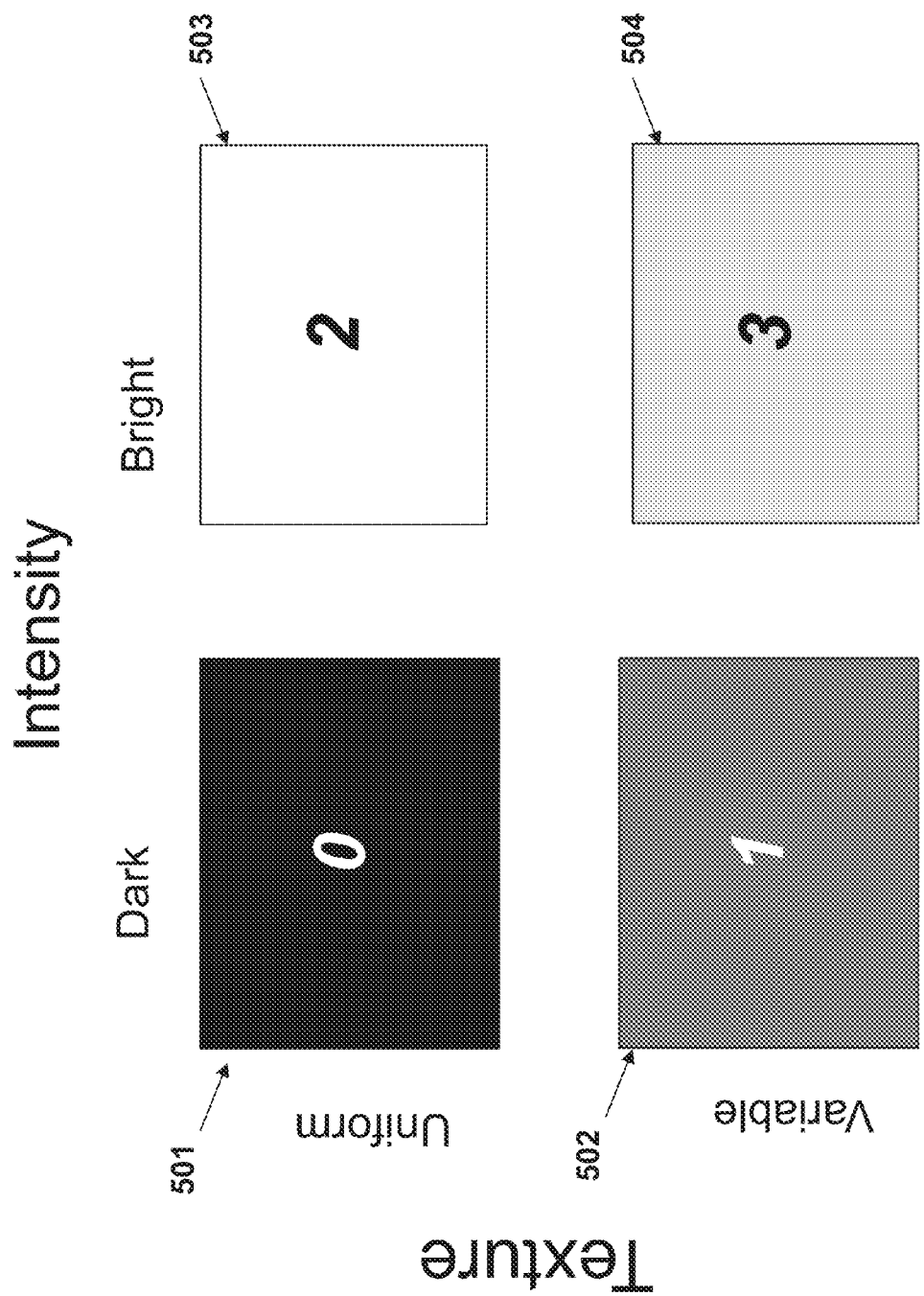
FIG. 5 depicts an exemplary set of intensity and texture categories that can be used in a computer-implemented image segmentation method in accordance with the present invention.
Figure 7:
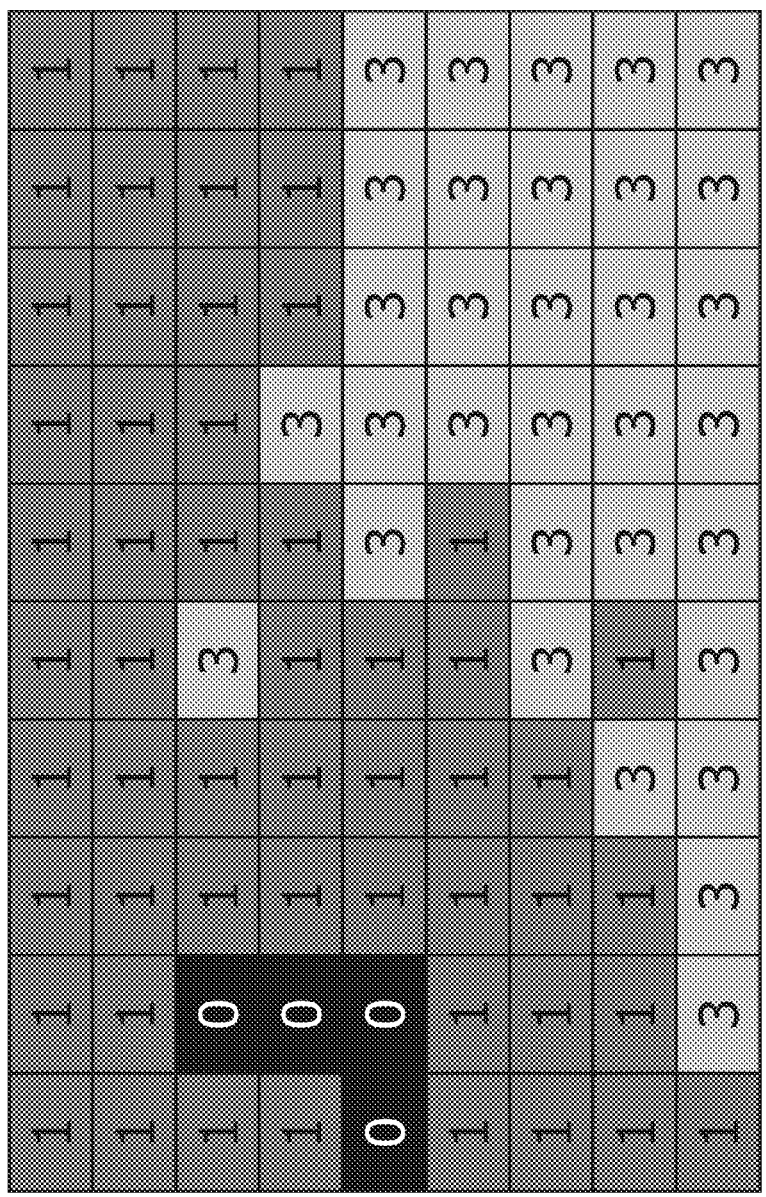
FIG. 7 depicts the matrix of FIG. 6 with the shadings of FIG. 5 applied thereto in a computer-implemented image segmentation method in accordance with the present invention.

In addition, in accordance with the present invention, each of the four intensity/texture categories 0 to 3 has a corresponding gray shading level as shown in FIG. 5. Thus, as illustrated in FIG. 7, at step 106 of the process of the present invention, each pixel can be assigned one of four shading levels 501, 502, 503, 504 in accordance with the value of its corresponding matrix element in the brightness/texture matrix. Once a corresponding shading level is assigned to each pixel, at step 107, using any appropriate image-generation software, the computer can generate a processed, segmented image from the shaded pixels.

Figures 8A, 8B, 8C:
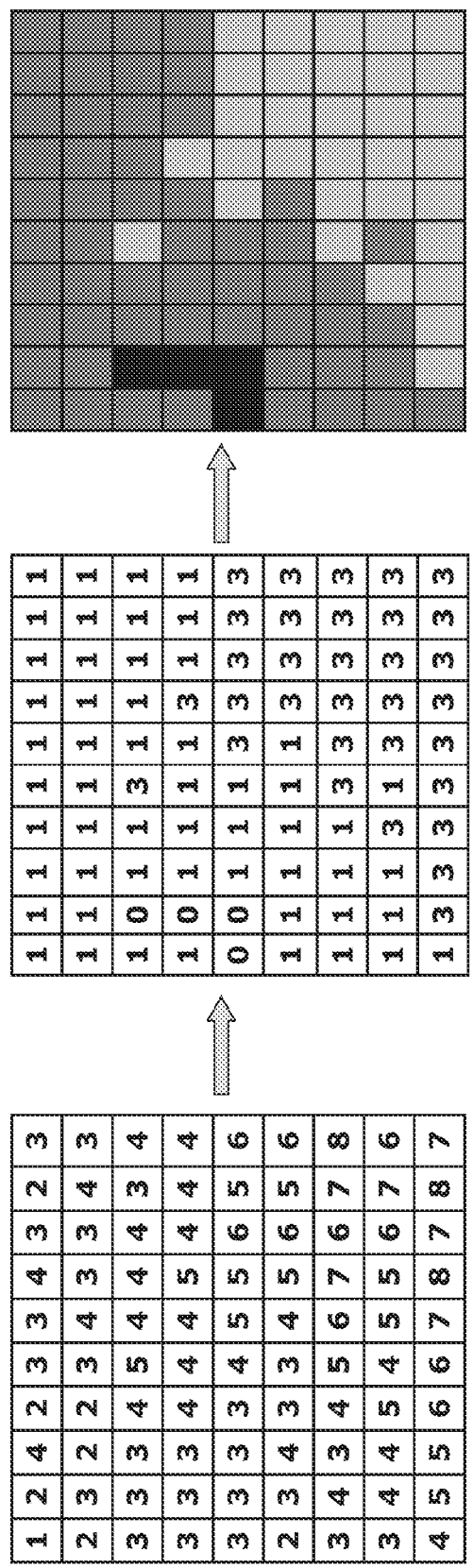
FIGS. 8A-8C depict, in summary form, an exemplary application of image/texture segmentation in accordance with the present invention.

Thus, to summarize, in accordance with the present invention, as shown in FIGS. 8A-8C, a digital image can be transformed into an intensity matrix (FIG. 8A), where each matrix element corresponds to a pixel in the image and the value of each matrix element corresponds to the brightness (intensity) of the underlying pixel. The intensity matrix can then be transformed into a brightness/texture matrix (FIG. 8B), where the value of each matrix element in the brightness/texture matrix corresponds to a bright/dark and uniform/textured nature of the underlying pixel. The values of the matrix elements in the brightness/texture matrix can be transformed into corresponding shadings (FIG. 8C) of each pixel in the processed image and a segmented image having those shadings can be produced.

It should be noted that conventional grayscale images can have as many as 255 or more grayscale levels, and having so many grayscale levels can in some cases result in every pixel being deemed to be textured since it is unlikely that all of a pixel's nearest neighbors will have exactly the same value. In such cases it may be desirable to reduce the number of grayscale categories to avoid this result. The optimum number of grayscale categories is not fixed and can vary depending on factors such as the type of image being processed or the use to be made of the image. In some cases the reduction in the number of grayscale categories can be done as an initial step in the process, while in other cases, the need for a reduction in the number of grayscale categories may become apparent only after an initial segmentation and processing of the image. Thus, in accordance with the present invention, once an image is segmented and processed as described above, it can be examined and if the results are not satisfactory, the number of grayscale categories can be revised and the image processed again using the new categories. Determining an optimum number of grayscale categories for a particular image may require more than one processing "pass" through the image, but once the optimal number of categories is determined, the same number of categories can be used for similar images or for images used in similar applications.

Figure 9B:
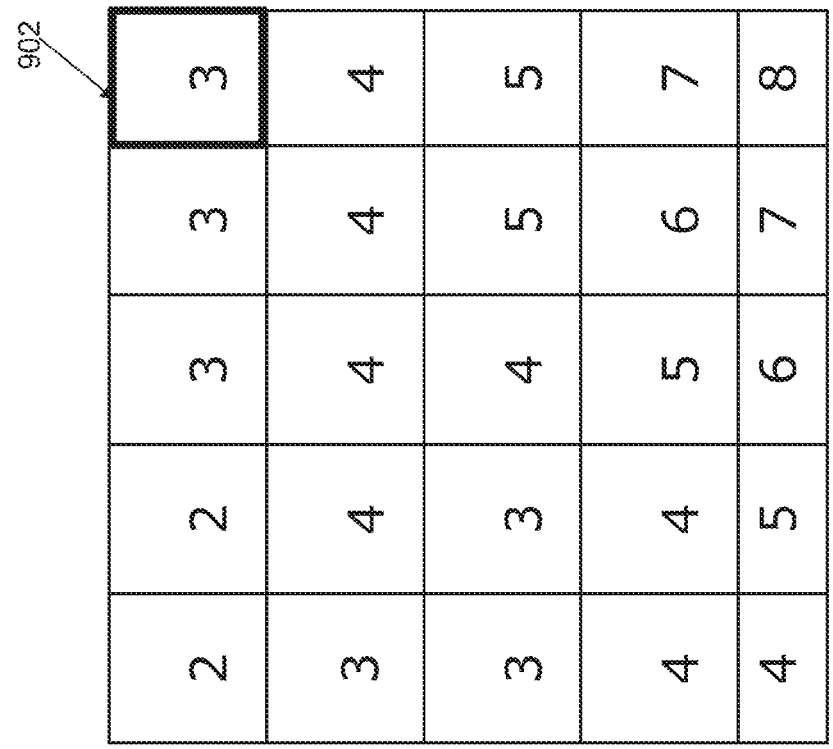
FIGS. 9A-9B depict exemplary aspects of intensity matrix rescaling that can be used in a computer-implemented image segmentation method in accordance with the present invention.
Figure 9A:
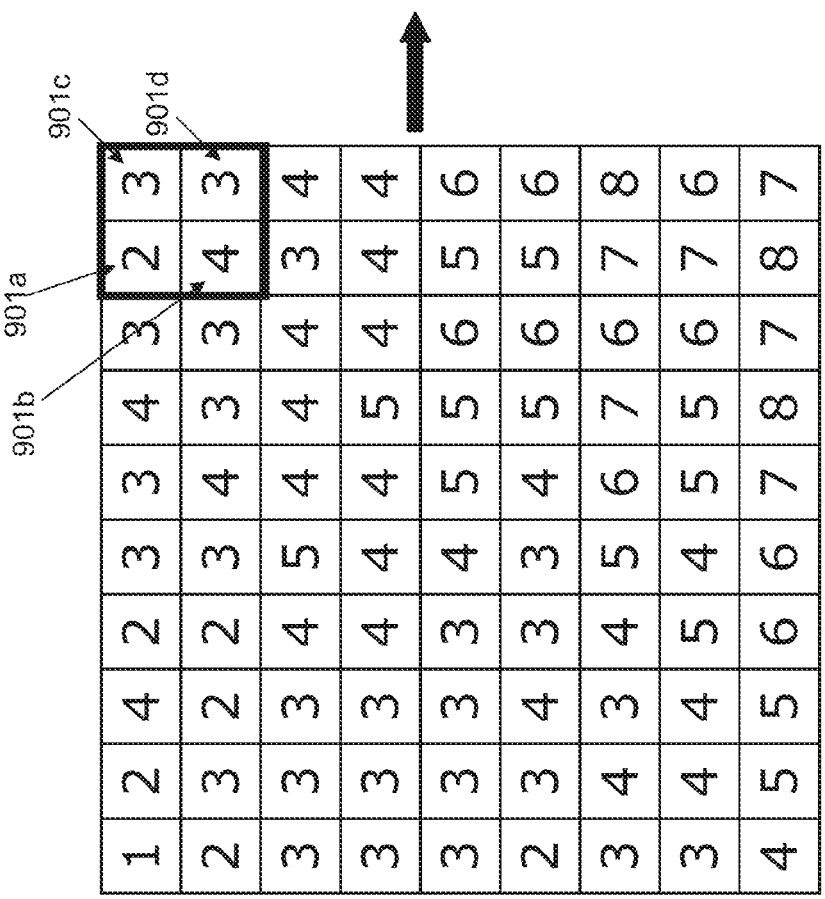

In addition, in some cases, an image may have too fine a resolution, i.e., too many pixels, to provide an accurate indication of the textures in the object depicted in the image. For example, a grayscale image may depict a rippled bottom, but the processed image may show the bottom as simply "dark and smooth" and "bright and smooth." In such cases, as described above, it may be desirable for the computer at step 103 to rescale the intensity matrix to reduce the number of matrix elements to better allow the texture to be shown as described in more detail below. Aspects of this rescaling are shown in FIGS. 9A and 9B. As shown in the Figure, the 10×9 element intensity matrix of FIG. 3 (FIG. 9A) can be transformed into a 5×5 element matrix (FIG. 9B) by combining a block of 4 elements 901a, 901b, 901c, 901d into a single matrix element 902 as shown in FIG. 9B. The value of the matrix element 902 can be determined in any appropriate manner, such as by taking a simple average of the values of the matrix elements being combined. Thus in the present example, the values of matrix elements 901a, 901b, 901c, and 901d have values of 2, 4, 3, and 3, respectively, and the value of matrix element 902 is 3, i.e., the average of the values of the matrix elements combined to form element 902. As with the rescaling of the intensity values to be used as described above, in accordance with the present invention, this rescaling step is optional depending on the particular case, and can be performed during a second or subsequent pass through the image until the desired results are achieved. In addition, as with the rescaling of the intensity values as described above, once the desired matrix scaling has been determined, it can be saved as a setting for the processing of other similar images or images used for similar purposes.

Also, in some cases, a simple "dark" versus "bright" categorization may not be sufficient to provide a useful segmented image. In such cases more brightness categories can be used, e.g., pixels having an intensity value of from 0 to 3 can be categorized as "dark," pixels having an intensity value of from 4 to 6 can be categorized as "medium," and those having an intensity value of from 7 to 9 can be categorized as "bright." The same can also be true for the use of only two texture categories, i.e., in some cases, a simple "uniform" versus "variable" categorization may not be sufficient to capture the textures of the object in the image in the manner desired, e.g., where the specific texture of an area is of particular importance for decision-making or analysis. In such cases, additional texture categories can be used based on the values in the intensity matrix. For example, a matrix element whose nearest neighbors have a value within a first range of the element's value can be categorized as having a first texture, while a matrix element whose nearest neighbors have a value within a second range of the element's value can be categorized as having a second texture. Care should be taken, however, to avoid the use of too many categories since that would defeat the purpose of image segmentation, which is designed to simplify the information contained in an image.

Further, in accordance with the present invention, the original image may be divided into sections (as if cutting a photograph with scissors) and processed separately on those sections, and the resulting image segmentation for the entire image will be essentially identical to the result from processing the image as a whole, except for possible minor differences due to different categories being assigned to pixels located at the "edge" of any image section. This feature of the present invention is useful when segmentation is desired for only a portion of the image and contrasts with many alternative (nonlocal) methods. In addition, this feature permits parallel processing of multiple image sections at once, and so further contributes to the speed and efficiency with which images can be processed in accordance with the invention.

It is also possible that in some cases a grayscale digital image may already have been transformed into an intensity matrix which has been stored in a volatile or non-volatile memory, and that in such cases, the process according to the present invention can begin with the computer's receipt of data of the intensity matrix rather than data of the digital image itself. This approach can permit several different segmentations to be performed on the same image, for example, using different scaling or segmentation schemes without the need for creation of the initial intensity matrix each time.

Figure 10C:
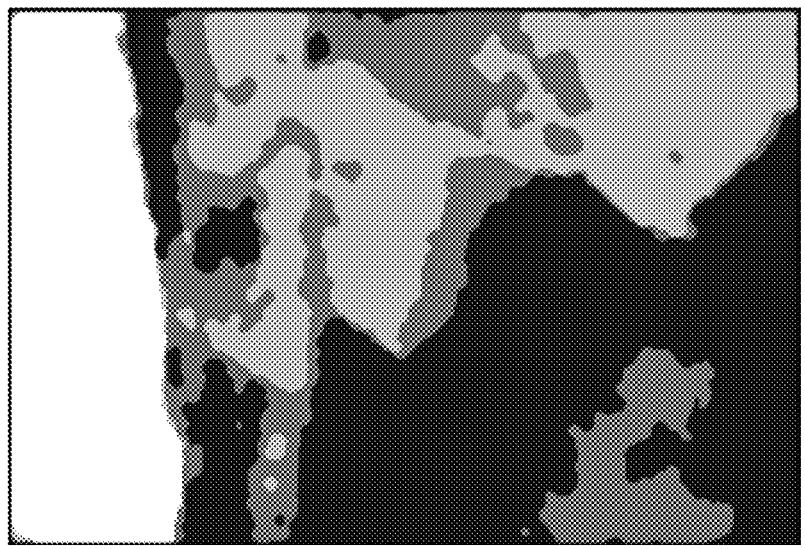
FIGS. 10A-10C depict aspects of image segmentation according to prior art and in accordance with the present invention.
Figure 10B:
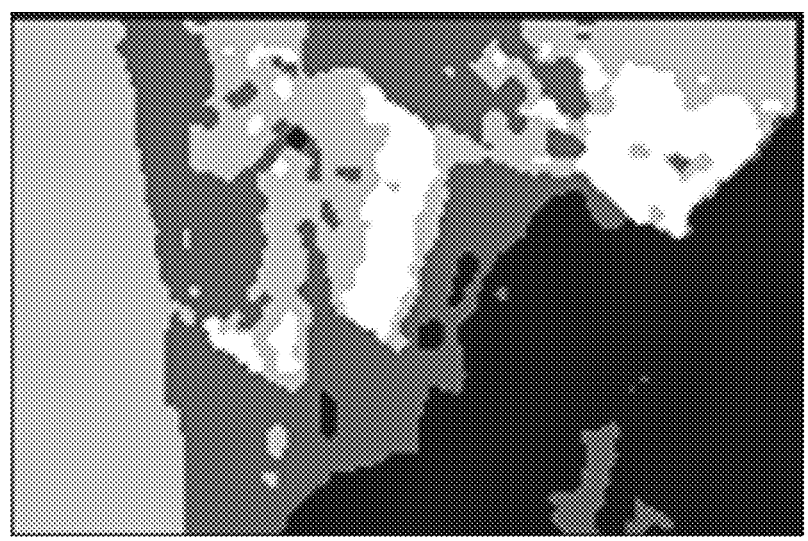
Figure 10A:
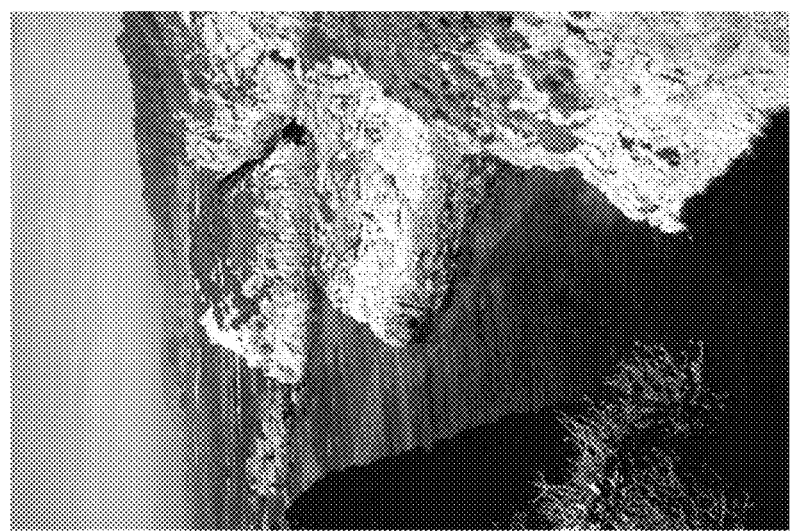

FIGS. 10A-10C illustrate aspects of the advantages of the image processing method in accordance with the present invention. FIG. 10A is an original grayscale digital photographic image of a rocky cliff with water below. FIG. 10B shows a two-level bright/dark categorization of the image in accordance with image segmentation methods of the prior art. As can be seen from FIG. 10B, application of such simple bright/dark categories fails to adequately depict the objects shown in the underlying image, since both the sky and the rocky cliffs are given the same shading based on their similar brightness levels without regard to their differing textures. FIG. 10C illustrates the same image processed using the 4-level image segmentation technique that includes brightness and texture in accordance with the present invention and filtered as described below. As can be readily seen in the image illustrated in FIG. 10C, including texture as part of the pixel classification distinguishes both the sky and vegetation in the image.

Figure 11B:
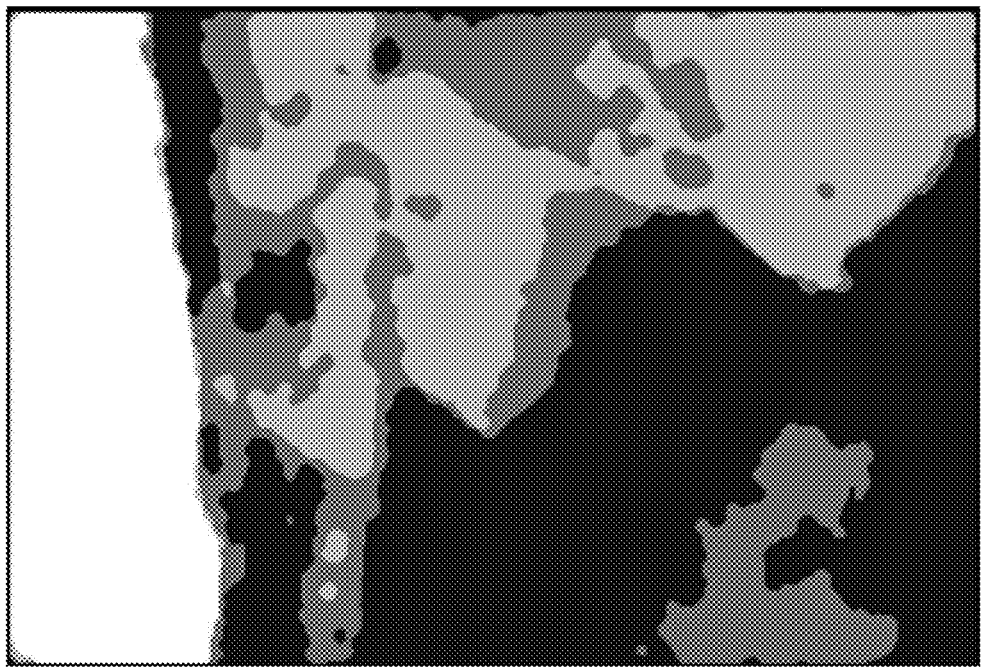
FIGS. 11A-11B depict further aspects of image segmentation and processing in accordance with the present invention.
Figure 11A:
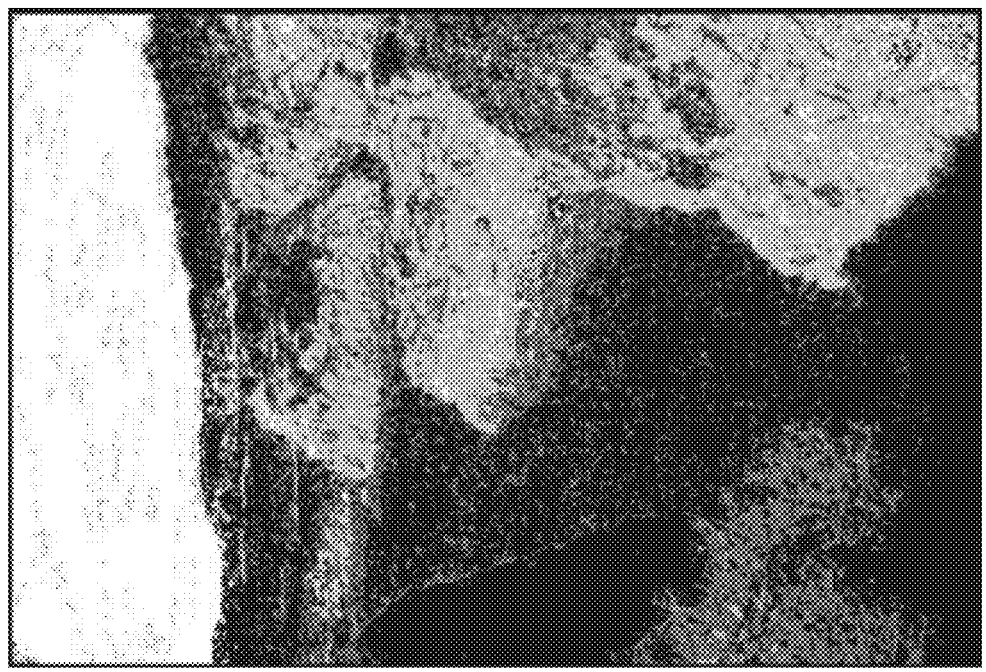

In addition, an image produced by a segmentation method such as that described herein often may contain "speckles" resulting from individual pixels being assigned one of the four (or more) specific grayscale values. While the overall segmented image shows the desired brightness and texture categorization, the speckles in the image can prevent the brightness and texture categorization from being as readily apparent as may be desirable. In such cases, the processed image can be run through a filter to make a cleaner-looking result. Any suitable filtering software can be used, for example, the "despeckle" filter that is freely available from IMAGEMAGICK Studios LLC. An example of such a "speckled" image is shown in FIG. 11A, which depicts the image shown in FIG. 10A which has been segmented but not yet filtered. FIG. 11B, which is identical to FIG. 10C, depicts the same image which has been run through the IMAGEMAGICK filter. As can be readily seen, the image in FIG. 11B is much cleaner-looking and more readily depicts the four brightness/texture categories, making quick analysis, either by a human user or by an analytic application, much faster and easier.

As noted above, one key use of the image segmentation method of the present invention involves the processing of grayscale acoustic images such as those produced by sidescan sonar sensors. In such sonar-produced acoustic images, loud echoes show as bright spots, while shadows and soft echoes, such as those produced by sand ripples show as dark spots. The Navy uses such acoustic images to search for underwater hazards such as mines that may be on top of the sea floor or buried underneath. Thus it is critical that Navy personnel and computers used to analyze such images be able to identify and distinguish such underwater features quickly and accurately.

Figure 12B:
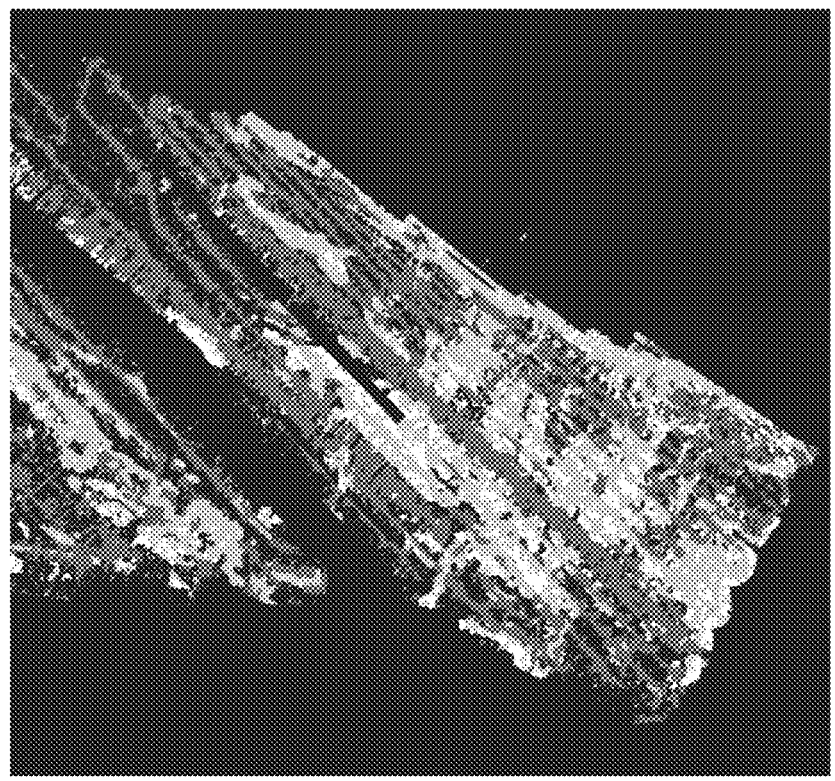
FIGS. 12A-12B depict an exemplary application of the image segmentation method of the present invention to show texture in a grayscale sonar image.
Figure 12A:
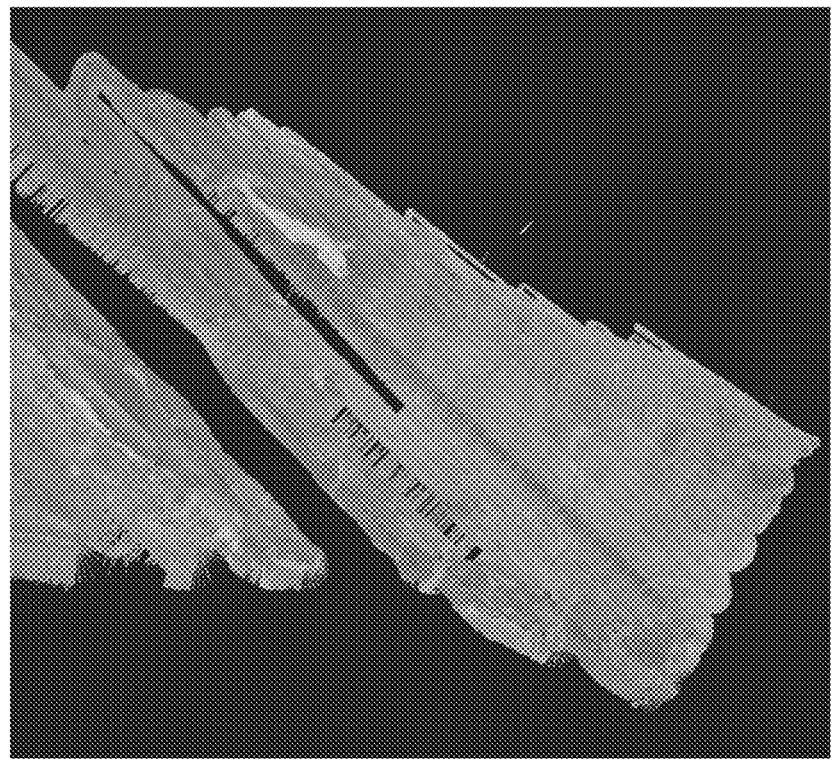

FIGS. 12A and 12B illustrate an exemplary application of the method of the present invention to an acoustic image of a portion of the seafloor. The portion of the seafloor captured in the image shown in FIG. 12A includes highly textured areas, but the image in FIG. 12A fails to adequately show the texture, instead showing the area in a fairly uniform grayscale. In contrast, the image shown in FIG. 12B, which was processed in accordance with the present invention and filtered as describe above, clearly shows smooth and textured areas by the different shadings for each type of feature in the image. The resulting segmentation aids geologists in identifying seafloor sediments as rock, sand, or mud.

Figure 13B:
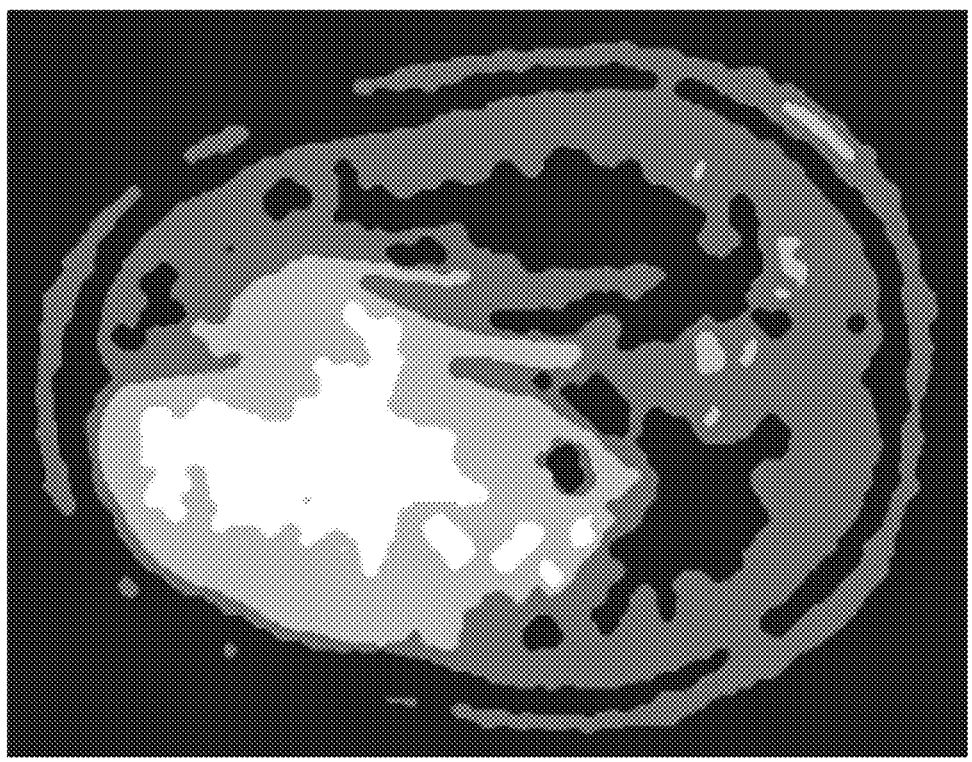
FIGS. 13A-13B depict an exemplary application of the image segmentation method of the present invention to an MRI image showing a tumor in a patient's brain.
Figure 13A:
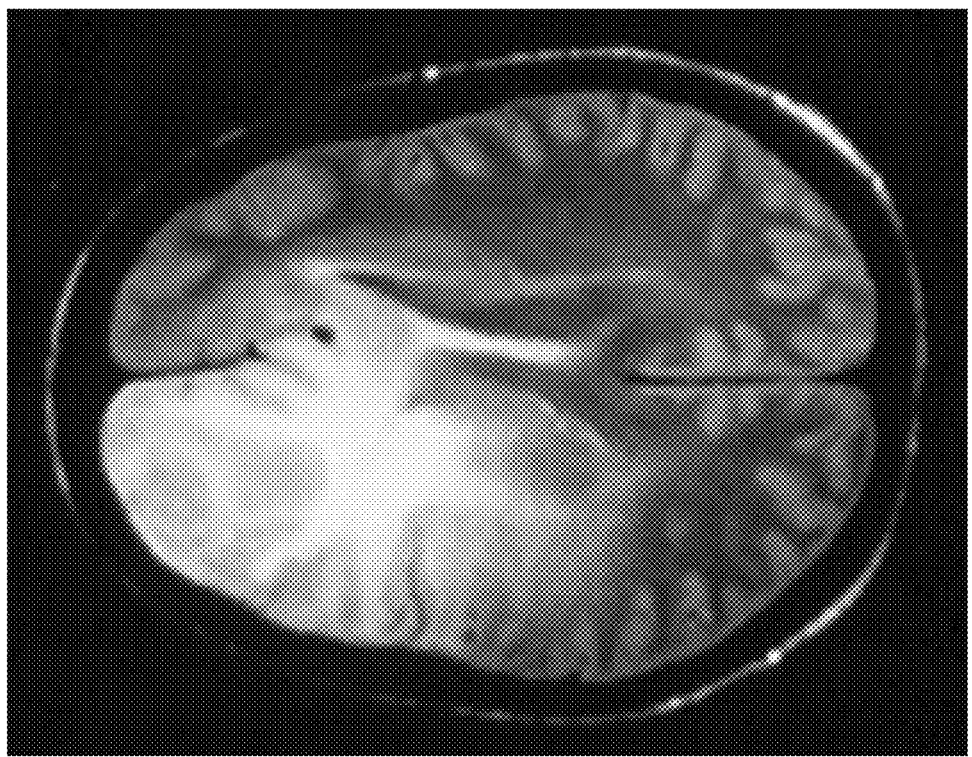

The image segmentation method of the present invention can also be used to enhance other types of images such as ultrasound or MRI images used in medical diagnosis and treatment. FIGS. 13A and 13B illustrate an application of the method of the present invention to an MRI of a tumorous brain from the Iowa Neuroradiology Library. As shown in FIG. 13A, a tumor can be seen as the bright spot in the upper left region of the MRI. Although the tumor can be seen in the original grayscale image shown in FIG. 13A, it is much more readily seen in the image shown in FIG. 13B which has been processed and filtered in accordance with the present invention. In the image shown in FIG. 13B, the tumor is clearly visible as the bright spot in the upper left region, with the periphery of the tumor being shown in light gray and the cerebrum represented as dark gray. Such a segmented image can more readily be used by medical personnel to quickly and accurately locate and identify anomalous regions in an image.

Thus, the image segmentation process of the present invention provides many advantages and new features over image processing methods of the prior art. The image segmentation process described above processes in linear time. (i.e., twice as much data takes about twice the processing time.) In fact, the process can execute with a single pass through the pixels of the image with only a few simple digital comparisons for each pixel. This allows one to segment large amounts of imagery data that would otherwise take a prohibitively long time or an expensive supercomputer. The image segmentation process of the present invention features computational speed comparable to the fastest methods based solely on brightness (quantization/histogram methods), while providing the important additional advantage of texture identification.

It should be noted that one or more aspects of a system and method for image segmentation and image processing as described herein can be accomplished by one or more processors executing one or more sequences of one or more computer-readable instructions read into a memory of one or more computers from volatile or non-volatile computer-readable media capable of storing and/or transferring computer programs or computer-readable instructions for execution by one or more computers. Volatile media can include a memory such as a dynamic memory in a computer. Non-volatile computer readable media that can be used can include a compact disk, hard disk, floppy disk, tape, magneto-optical disk, PROM (EPROM, EEPROM, flash EPROM), SRAM, SDRAM, or any other magnetic medium; punch card, paper tape, or any other physical medium such as a chemical or biological medium.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A computer-implemented method for processing a grayscale digital image, comprising:

receiving, at a computer programmed with appropriate software, data of an intensity matrix, each matrix element in the intensity matrix representing a pixel in the grayscale digital image, a value of each matrix element in the intensity matrix corresponding to a quantized intensity of the pixel represented by that matrix element, each quantized intensity value representing a corresponding brightness level of the pixel;

comparing a value of each matrix element in the intensity matrix to values of all available nearest neighbor matrix elements, assigning a texture of the pixel corresponding to the matrix element in accordance with the values of the nearest neighbor matrix elements, and categorizing the pixel categorized according to its brightness and its texture;

transforming the intensity matrix into a brightness/texture matrix, each matrix element in the brightness/texture matrix corresponding to a matrix element in the intensity matrix and having one of a predefined brightness/texture values corresponding to the categorization of the pixel corresponding to the matrix element in the intensity matrix, each brightness/texture value having one of a specified corresponding shading levels associated therewith, the transformation of the intensity matrix into the brightness/texture matrix being performed by the computer in a single pass through the intensity matrix;

assigning one of the specified shading levels to each pixel based on the value of the corresponding matrix element in the brightness/texture matrix; and generating a segmented image, each pixel in the segmented image having a shading level corresponding to its brightness/texture value;

wherein each pixel is categorized as being one of dark and uniform, dark and variable, medium and uniform, medium and variable, bright and uniform, and bright and variable, and wherein each brightness/texture matrix element is assigned one of six brightness/texture values corresponding to the pixel's categorization, each of the six brightness/texture values corresponding to one of six specified shading levels.

2. The method for processing a grayscale digital image according to claim 1, further comprising rescaling the intensity matrix to form a rescaled intensity matrix, a number of matrix elements in the rescaled intensity matrix being smaller than a number of matrix elements in the original intensity matrix.

3. The method for processing a grayscale digital image according to claim 1, further comprising assigning one of a plurality of brightness categories to a pixel, each brightness category corresponding to a range of intensity values.

4. The method for processing a grayscale digital image according to claim 1, further comprising assigning one of a plurality of texture categories to a pixel, each texture category corresponding to a range of differences in the value between the pixel's intensity value and the intensity value of its nearest neighbors.

5. The method for processing a grayscale digital image according to claim 1, further comprising dividing the image into a plurality of sections, processing each section separately, and combining the processed sections to produce the final segmented image.

6. The method for processing a grayscale digital image according to claim 1, wherein the plurality of sections are processed in parallel.

7. The method for processing a grayscale digital image according to claim 1, further comprising despeckling the image before producing the final segmented image.

8. The method for processing a grayscale digital image according to claim 7, wherein the despeckeling is performed using a smoothing filter.

* * * * *